(12) United States Patent
Shen et al.

(10) Patent No.: US 12,717,714 B2
(45) Date of Patent: Aug. 25, 2026

(54) CONTROL CIRCUIT, OPERATION METHOD AND NON-TRANSITORY COMPUTER READABLE STORAGE MEDIUM

(71) Applicant: SILICON MOTION INC., Hsinchu County (TW)

(72) Inventors: Yang-Chih Shen, Hsinchu County (TW); Po Sheng Chou, Hsinchu County (TW); Bo-Yan Jhan, Hsinchu County (TW)

(73) Assignee: SILICON MOTION INC., Hsinchu County (TW)

( * ) Notice: Subject to any disclaimer, the term of this patent is extended or adjusted under 35 U.S.C. 154(b) by 0 days.

(21) Appl. No.: 19/021,819

(22) Filed: Jan. 15, 2025

(65) Prior Publication Data

US 2025/0252048 A1 Aug. 7, 2025

(30) Foreign Application Priority Data

Feb. 6, 2024 (TW) ................................ 113104832

(51) Int. Cl.
*G06F 12/02* (2006.01)

(52) U.S. Cl.
CPC ................................ *G06F 12/0246* (2013.01)

(58) Field of Classification Search
None
See application file for complete search history.

(56) References Cited

U.S. PATENT DOCUMENTS 9,202,576 B2 * 12/2015 Shereshevski ...... G11C 11/5628
9,773,565 B1 * 9/2017 Yeh ...................... G11C 29/028
2020/0135280 A1 4/2020 Hu
2021/0311830 A1 10/2021 Lee
2024/0029801 A1 * 1/2024 Nguyen ............. G11C 11/5642

FOREIGN PATENT DOCUMENTS

TW 202022861 A 6/2020
TW 202205081 A 2/2022

* cited by examiner

*Primary Examiner* — Khoa D Doan
(74) *Attorney, Agent, or Firm* — CKC & Partners Co., LLC

(57) ABSTRACT

A control circuit, comprising a storage circuit and a processor. The storage circuit is configured to store a retry sequence table and a plurality of read-voltage tables. The processor is coupled to the storage circuit, and is configured to access a memory comprising a plurality of blocks. When a read error occurs in a first block of the plurality of blocks, the processor sequentially uses the plurality of read-voltage tables to perform a retry test on the first block according to a retry sequence indicated by the retry sequence table. When a retry history data of the first block matches an adjustment condition, the processor adjusts the retry sequence indicated by the retry sequence table.

17 Claims, 7 Drawing Sheets

TA

| index value | read-voltage table |
|---|---|
| 0 | TB0 |
| 1 | TB1 |
| 2 | TB2 |
| ⋮ | |
| k | TBk |

TB

| read-voltage table | first threshold voltage deflection (mV) | second threshold voltage deflection (mV) | third threshold voltage deflection (mV) |
|---|---|---|---|
| TB0 | 0 | 2 | 1 |
| TB1 | 1 | 0 | 3 |
| TB2 | 4 | 3 | 1 |
| ⋮ | | | |
| TBk | 2 | 1 | 3 |

TC

| retry sequence | index value |
|---|---|
| 1 | 4 |
| 2 | 1 |
| 3 | 2 |
| 4 | 3 |
| 5 | 5 |
| 6 | 6 |
| 7 | 7 |

| | Head | | | | | Tail |
|---|---|---|---|---|---|---|
| block | 2 | 37 | 12 | 99 | 7 | 89 |
| block retry parameter | 0 | 5 | 2 | 0 | 7 | 1 |

Fig. 6

CONTROL CIRCUIT, OPERATION METHOD AND NON-TRANSITORY COMPUTER READABLE STORAGE MEDIUM

CROSS-REFERENCE TO RELATED APPLICATION

This application claims priority to Taiwan Application Serial Number 113104832, filed Feb. 6, 2024, which is herein incorporated by reference in its entirety.

BACKGROUND

Technical Field

The present disclosure relates to memory technology, and specifically refers to a control circuit, an operation method and a non-transitory computer readable storage medium for improving memory reading efficiency.

Description of Related Art

The aging state of the memory in the storage device will change with environmental factors such as temperature, humidity, using time, access times. Generally speaking, the storage device stores multiple sets of compensation voltages provided by the memory manufacturer in advance. Each set of compensation voltages is configured to adjust a word line voltage(s) used by the storage device during read operations. When a read failure occurs, the storage device will select an appropriate set of compensation voltages for subsequent read operations according to the aging state of the memory currently being used. However, the conventional storage device needs to take a long time to search for a suitable set of compensation voltages, so the read efficiency is too low.

SUMMARY

One aspect of the present disclosure is a control circuit, comprising a storage circuit and a processor. The storage circuit is configured to store a retry sequence table and a plurality of read-voltage tables. The processor is coupled to the storage circuit, and is configured to access a memory comprising a plurality of blocks. When a read error occurs in a first block of the plurality of blocks, the processor sequentially uses the plurality of read-voltage tables to perform a retry test on the first block according to a retry sequence indicated by the retry sequence table. When a retry history data of the first block matches an adjustment condition, the processor adjusts the retry sequence indicated by the retry sequence table.

Another aspect of the present disclosure is an operation method applied to a control circuit, wherein the control circuit is configured to access a memory comprising a plurality of blocks, store a retry sequence table and a plurality of read-voltage tables, and the operation method comprises: when a read error occurs in a first block of the plurality of blocks, sequentially using the plurality of read-voltage tables to perform a retry test on the first block according to a retry sequence indicated by the retry sequence table; and when a retry history data of the first block matches an adjustment condition, adjusting the retry sequence indicated by the retry sequence table.

Another aspect of the present disclosure is a non-transitory computer readable storage medium, comprising a plurality of computer-readable instructions. When a processor executes the plurality of computer-readable instructions, the plurality of computer-readable instructions cause the processor to access a memory comprising a plurality of blocks, and perform the following: when a read error occurs in a first block of the plurality of blocks, sequentially using a plurality of read-voltage tables to perform a retry test on the first block according to a retry sequence indicated by a retry sequence table, wherein the retry sequence table and the plurality of read-voltage tables are stored in a storage circuit coupled to the processor; and when a retry history data of the first block matches an adjustment condition, adjusting the retry sequence indicated by the retry sequence table.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 5 is a schematic diagram of a retry sequence table in some embodiments of the present disclosure.

FIG. 6 is a schematic diagram of a connection table in some embodiments of the present disclosure.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
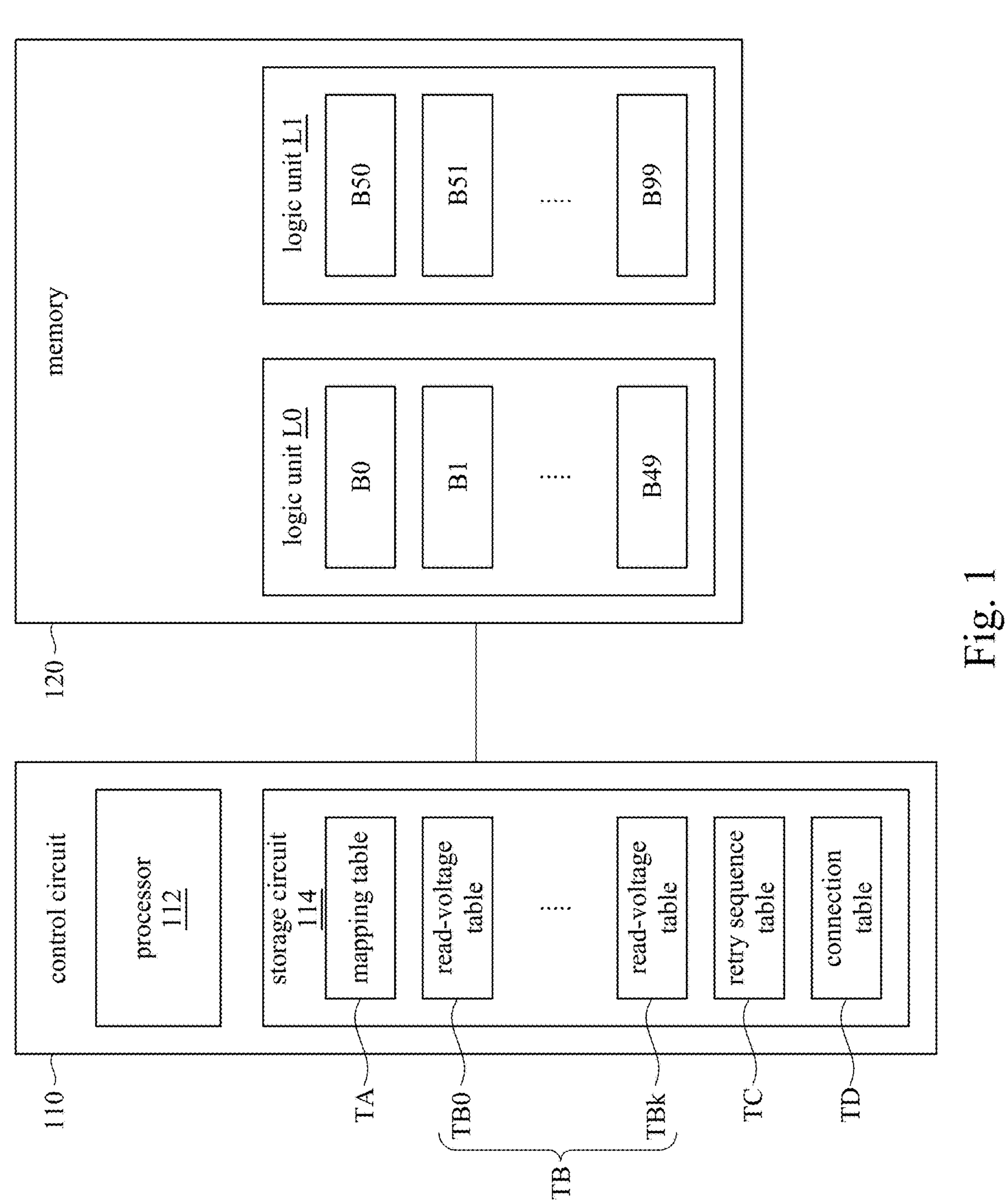
FIG. 1 is a simplified functional block diagram of an electronic system in some embodiments of the present disclosure.

FIG. 1 is a simplified functional block diagram of an electronic system 100 in some embodiments of the present disclosure. The electronic system 100 includes a control circuit 110 and a memory 120. The control circuit 110 is communicatively coupled to an external computing circuit (not shown in the figure, such as a central processing unit), so as to perform corresponding access operations such as reading, writing, or erasing on the memory 120 according to the read, write, and erase command provided by the external computing circuit. In some embodiments, the memory 120 may be implemented by flash memory (e.g., NAND memory) or other suitable types of non-volatile memory.

The memory 120 includes multiple logic units L0-L1 (LUN, also known as "die"), as shown in FIG. 1. Each of the logic units L0-L1 includes multiple blocks, such as a logic unit L0 including multiple blocks B0-B49, and a logic unit L1 including multiple blocks B50-B99.

The control circuit 110 includes a processor 112 and a storage circuit 114. The processor 112 is coupled to the storage circuit 114, and is communicatively coupled to the logic units L0-L1 of the memory 120, so as to perform corresponding access operations on the storage circuit 114 and the memory 120.

In some embodiments, the processor 112 may include, but is not limited to, a single processor and an integration of multiple microprocessors. The processor 112 may be implemented as a central processing unit (CPU), a system on chip (SoC), an application processor, a digital signal processor or a processing chip or controller for a specific function.

The storage circuit 114 stores multiple mapping tables TA, multiple read-voltage tables TB0-TBk and a retry sequence table TC, and k is a positive integer greater than 1. In one embodiment, the storage circuit 114 is an internal memory of the control circuit 110, but the present disclosure is not limited to this. In addition, the numbers of the logic units, the blocks and the read-voltage tables in FIG. 1 are only an example of the present disclosure, and the present disclosure is not limited to this.

Figures 2, 3:
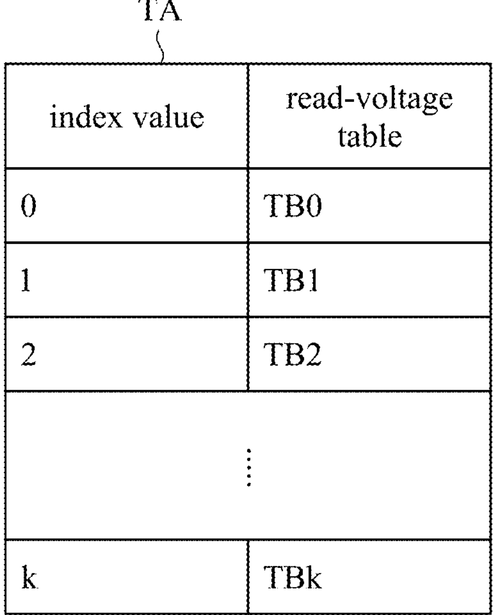
FIG. 2 is a schematic diagram of a mapping table in some embodiments of the present disclosure.
FIG. 3 is a schematic diagram of a read-voltage table in some embodiments of the present disclosure.

FIG. 2 is a schematic diagram of a mapping table TA in some embodiments of the present disclosure. The mapping table TA includes multiple index value 0-k, and records a relationship between each of the index values and each of the read-voltage tables TB0-TBk. As shown in FIG. 2, the index value 0-k respectively correspond to the read-voltage tables TB0-TBk.

FIG. 3 is a schematic diagram of the read-voltage tables TB (including TB0-TBk) in some embodiments of the present disclosure. The following explains an application of the read-voltage tables TB0-TBk according to FIGS. 1-3. As shown in FIG. 3, each of the read-voltage tables TB0-TBk records deflections of multiple threshold voltages. "Threshold voltage (Vth)" represents a reference voltage value used by the processor 112 when reading to the memory 120. When the threshold voltage is "1.5V", the processor 112 uses this threshold voltage as a basis to determine whether the data stored in each block of the memory 120 has a bit value of "0" or "1". For example, when the processor 112 reads the voltage in a block as "1.2V", since 1.2V is less than 1.5V, the result read by the processor 112 is a bit value "0". On the other hand, when the processor 112 reads the voltage in the block as "2V", since 2V is greater than 1.5V, the result read by the processor 112 is a bit value "1".

As mentioned above, the data stored in the memory 120 is prone to errors due to access operations (i.e., reading, writing, erasing) and environmental influences (i.e., temperature). Therefore, when the processor 112 finds that there is an error in the data stored in the memory 120, the processor 112 needs to adjust the threshold voltage (e.g., increasing 1.5V to 1.7V) to reduce the impact of these error data. This operation is called "Retry test (or Retry Read)".

The number of "deflections of threshold voltages" in the read-voltage tables TB0-TBk depends on the type of the memory 120. When reading the memory 120, the processor 112 sequentially applies multiple threshold voltages to the word line(s) according to a selected read-voltage table, so as to determine a bit value stored in the memory cell of the memory 120. Since one of ordinary skill in the art can understand how to detect errors in memory, it will not be described in detail here.

For example, in an embodiment where the memory 120 is a multi-level cell (MLC) memory, the processor 112 sequentially applies three different threshold voltages to the word lines. As shown in FIG. 3, each of the read-voltage tables TB0-TBk records a first threshold voltage deflection, a second threshold voltage deflection and a third threshold voltage deflection. The processor 112 adjusts the threshold voltage to be applied to the word lines according to the deflections recorded in the read-voltage tables TB0-TBk, so as to compensate for variations in the memory 120 under different usage conditions (e.g., ambient temperature or total usage hours).

Similarly, if the memory 120 is a Triple-Level Cell (TLC) memory, each of the read-voltage tables records seven deflections of threshold voltages (threshold voltage deflections). The processor 112 adjusts the threshold voltage to be applied to the word lines according to the deflections recorded in the read-voltage tables. For the sake of brevity, it will not be repeated here.

Figure 4:
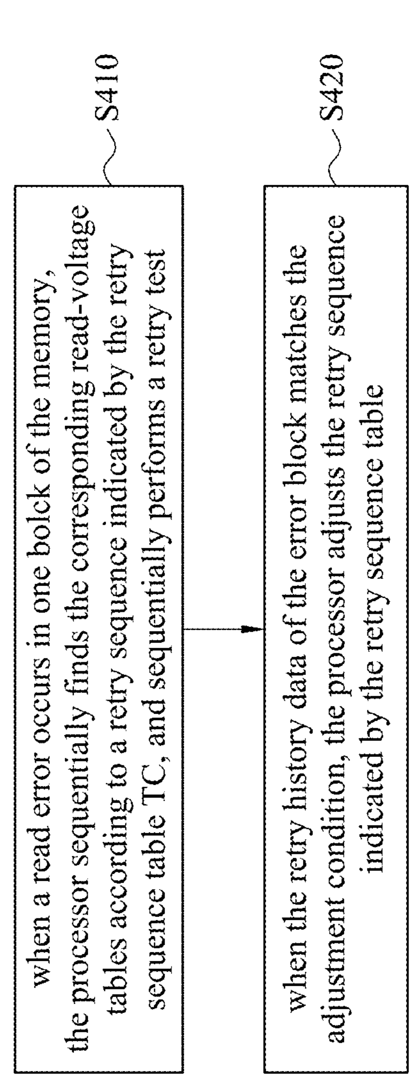
FIG. 4 is a flowchart illustrating an operation method in some embodiments of the present disclosure.

FIG. 4 is a flowchart illustrating an operation method 400 in some embodiments of the present disclosure. Any combination of features in the operation method 400 can be implemented as multiple computer-readable instructions stored in non-transitory computer readable storage medium. When these instructions are performed by the processor 112, these instructions will cause a part or all of the operation method 400 to be performed.

Referring to FIG. 4 and FIG. 5, FIG. 5 is a schematic diagram of a retry sequence table TC in some embodiments of the present disclosure. In step S410, when a read error occurs in one of the blocks B0-B99 (e.g., the block 99), the processor 112 sequentially finds the corresponding read-voltage tables according to a retry sequence indicated by the retry sequence table TC, and sequentially performs a retry test to the corresponding block, which occurs the read error, according to the corresponding read-voltage table.

In some embodiments, "retry sequence" is associated with the arrangement of the index values in the retry sequence table TC. For example, the first to seventh fields in the retry sequence table TC record the index values "4, 1, 2, 3, 5, 6, 7" in order, and the processor 112 sequentially uses the read-voltage tables TB4, TB1, TB2, TB3, TB5, TB6 and TB7 to perform the retry test to the error block. In other words, the retry sequence can be understood as a sequence of the read-voltage tables TB0-TBk used by the processor 112 in the retry test. It is worth mentioning that the retry sequence does not need to be consistent with a sequence of the fields in the retry sequence table TC.

In step S420, when performing the retry test according to the retry sequence indicated by the retry sequence table TC, the processor 112 will monitor a retry history data of the error block (e.g., block 99), so as to determine whether the retry history data matches an adjustment condition. When the retry history data matches the adjustment condition, the processor 112 adjusts the retry sequence indicated by the retry sequence table TC (i.e., adjusts the arrangement of the index values in the retry sequence table TC). In other words, the arrangement of the index values in the retry sequence table TC changes dynamically. The adjustment condition and adjustment method of the processor 112 adjusting the retry sequence table TC can be stored or set in the control circuit 110 in advance.

In one embodiment, the storage circuit 114 further stores a connection table TD (Linked Table). The connection table TD is configured to record multiple blocks, which are in a programmed state (i.e., has been written with the data), of the blocks B0-B99. For the sake of identification, the block in the programmed state is called "programming block". The processor 112 will record the blocks into the connection table TD sequentially according to a sequence in which the blocks enter into the programmed state. In other words, the processor 112 uses the connection table TD to record the programmed state of the programming block, and the connection table TD can represent a relative time point or a relative sequence (order) in which the programming blocks enter into the programmed state.

FIG. 6 is a schematic diagram of a connection table TD in some embodiments of the present disclosure. The connection table TD records multiple programming blocks, as a sequence shown in FIG. 6 "2, 37, 12, 99, 7, 89". The programming block on the leftmost (block "2") is a Head of the connection table TD, and the programming block on the rightmost (block "89") is a Tail of the connection table TD. For example, the programming blocks "2" and "37" are arranged adjacently in the connection table TD, which means that orders of entering into the programmed state of the two programming blocks are one after another (i.e., successive). Similarly, the programming blocks "37" and "12" are arranged adjacently in the connection table TD, which means that orders of entering into the programmed state of the two programming blocks are successive. In addition, when the processor 112 erases the data of one of the programming blocks, the processor 112 also removes a record of the one of the programming blocks from the connection table TD.

The connection table TD further records the retry history data of each programming block. In one embodiment, the retry history data is a block retry parameter. "Block retry parameter" represents a corresponding one of the read-voltage tables used by the processor 112 when the processor 112 successfully performs the retry test on the programming block. The parameter can correspond to an index value in the retry sequence table TC. As shown in FIG. 5 and FIG. 6, a block retry parameter corresponding to the programming block "37" is "5", which means the processor 112 performs the retry test successfully by using the read-voltage tables TB5 corresponding to the index value "5" when the processor 112 performs the retry test on the programming block "37".

As mentioned above, similarly, the block retry parameter of the programming block "12" is "2", which means that when the processor 112 performs the retry test on the programming block "37", the processor 112 uses the read-voltage tables TB2 corresponding to the index value "2" to successfully perform the retry test. In addition, the block retry parameter of the programming block "2" is "0", which means that the programming block "2" has not performed the retry test.

The details of the aforementioned step S420 will be further described below. "Adjustment condition" of the processor 112 adjusting the retry sequence table TC can be "the programming block has not been performed the retry test", and this condition can be confirmed by determining the retry history data (the block retry parameter). "Adjustment method" of the processor 112 adjusting the retry sequence table TC can be "adjusting the retry sequence according to the retry history data (the block retry parameter) of adjacent blocks in the connection table TD". In other words, before performing the retry test on one of the programming blocks, if the programming block has not performed the retry test, the processor 112 can use "the retry history data (the block retry parameter) of adjacent blocks in the connection table TD" to adjust the retry sequence indicated by the retry sequence table TC.

Figure 7:
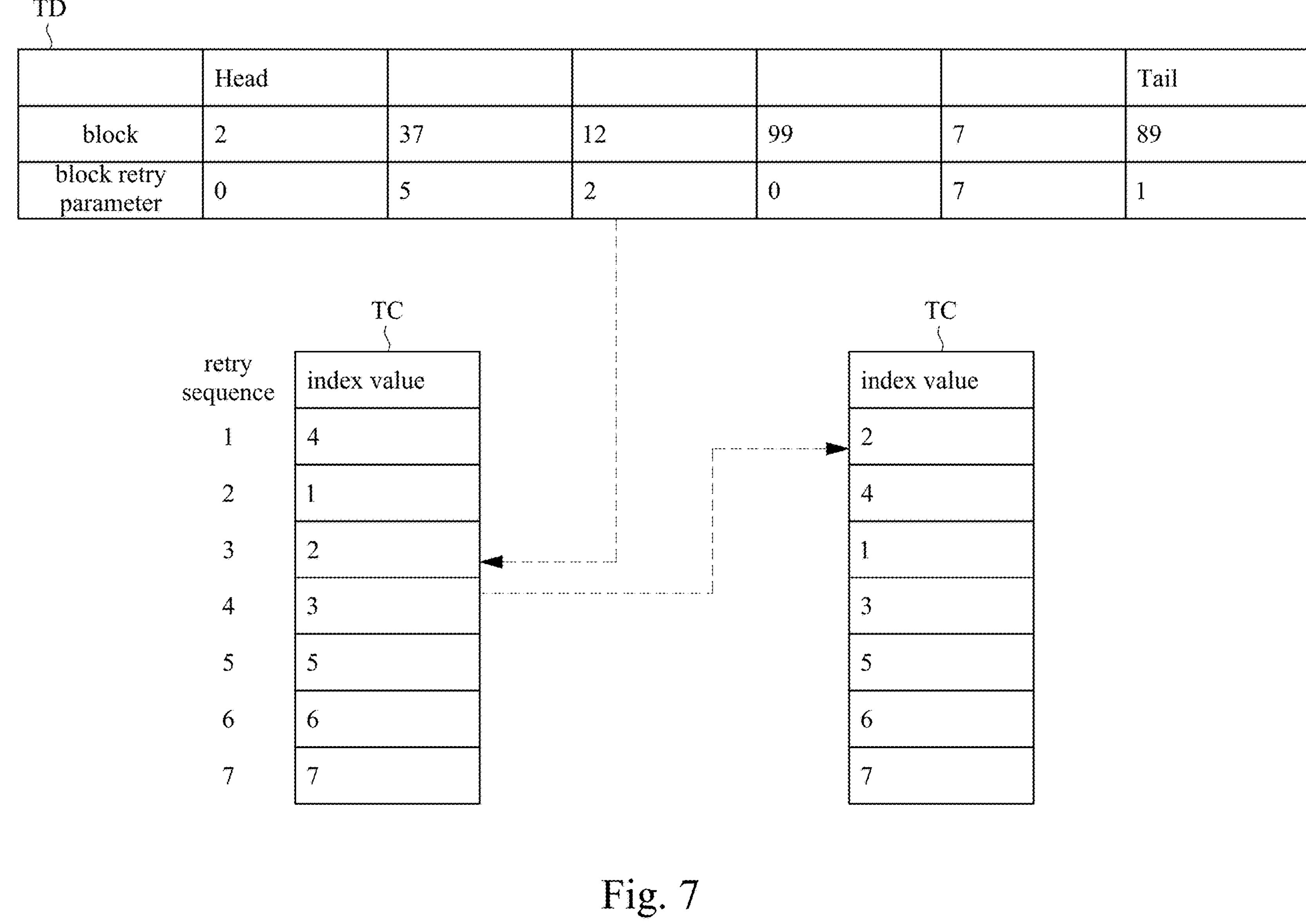
FIG. 7 is a schematic diagram of the retry sequence table being adjusted according to the connection table in some embodiments of the present disclosure.

FIG. 7 is a schematic diagram of the retry sequence table TC being adjusted according to the connection table TD in some embodiments of the present disclosure. In one embodiment, the programming block "99" is a programming block currently performing the retry test. Before performing the retry test, the retry sequence of the index values indicated by the retry sequence table TC is "4, 1, 2, 3, 5, 6, 7".

Since the block retry parameter of the programming block "99" is "0", which means that the programming block "99" has not been performed the retry test before, at this time, the processor 112 uses "the retry history data (the block retry parameter) of adjacent block(s) in the connection table TD" to adjust the retry sequence indicated by the retry sequence table TC. As shown in FIG. 7, the programming blocks adjacent to the programming block "99" in the connection table TD are the programming blocks "12" and "7", and it means that the order of entering into the programmed state of the programming blocks "12" and "7" is successive to the order of entering into the programmed state of the programming block "99". The processor 112 has a selection rule set in advance. For example, the processor 112 selects "the previous programmed block (i.e., the programming block "12")", or selects "the next programmed block (i.e., the programming block "7")".

As mentioned above, the processor 112 updates a first order in the retry sequence indicated by the retry sequence table TC according to the selected programming block. For example, if the processor 112 selects/chooses the block retry parameter "2" of the programming block "12" to update the retry sequence table TC, the processor 112 moves the index value "2" (corresponding to the read-voltage tables TB2) of the retry sequence table TC to the first order, and other index values are moved backward in sequence, so that the retry sequence of the index values indicated by the retry sequence table TC is changed to "2, 4, 1, 3, 5, 6, 7".

Figure 8:
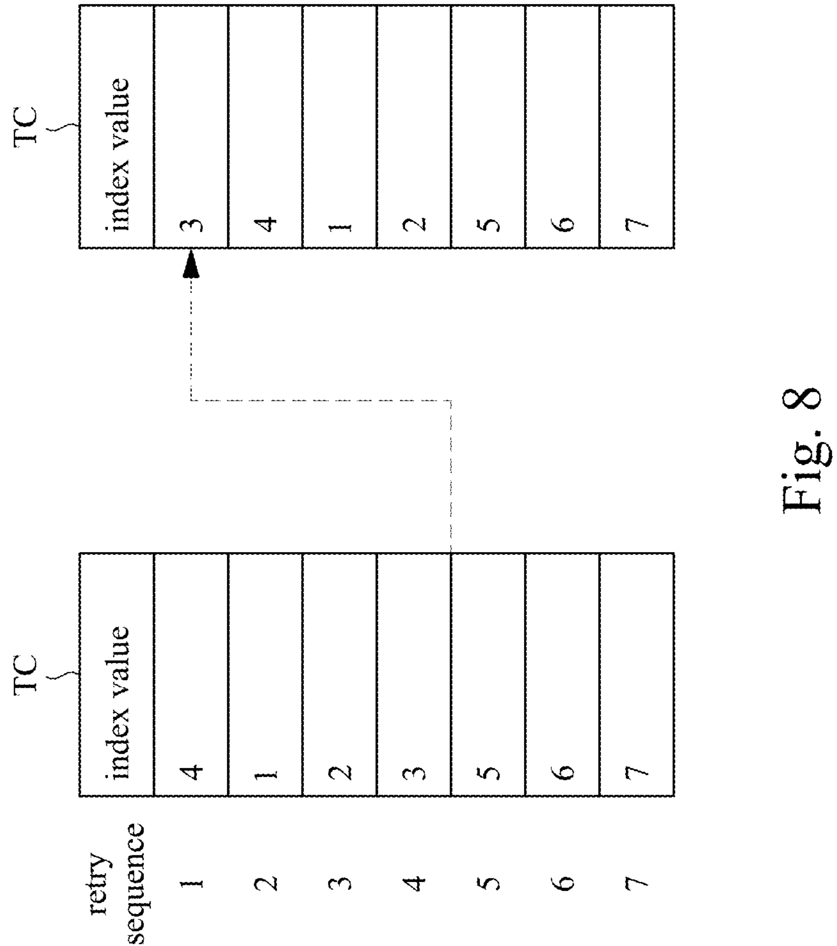
FIG. 8 is a schematic diagram of the retry sequence table being adjusted in some embodiments of the present disclosure.

The following describes another embodiment of the "adjustment method" of the processor 112 adjusting the retry sequence table TC. FIG. 8 is a schematic diagram of the retry sequence table TC being adjusted in some embodiments of the present disclosure. As shown in a table on the left side of FIG. 8, the retry sequence of the index values indicated by the retry sequence table TC is "4, 1, 2, 3, 5, 6, 7". The processor 112 sequentially uses the read-voltage tables TB corresponding to the index values according to the retry sequence, and performs the retry test on the corresponding programming block (such as block "99"). That is, the processor 112 sequentially uses the multiple threshold voltage deflections recorded in the read-voltage tables TB4, TB1, TB2, TB3, TB5, TB6, and TB7 to perform the retry test.

For sake of explanation, "the read-voltage tables TB currently used when performing the retry test" will be called a "target read-voltage table". When the processor 112 uses the target read-voltage table to successfully perform the retry test on the programming block (i.e., a reading result is within an expected range and passes the retry test), the processor 112 records a N-th order of the target read-voltage table in the retry sequence into the retry history data of the programming block.

As mentioned above, in some embodiments, the retry sequence includes M orders. When using "a read-voltage tables TB corresponding to an index value recorded by the N-th order in M orders" to perform the retry test on the programming block and test successfully, the processor 112 determines whether N is greater than or equal to a threshold value. If N is greater than or equal to the threshold value, the processor 112 adjusts the target read-voltage table from the corresponding N-th order in the retry sequence to the first order in the retry sequence. Both M or N are a positive integer greater than 1. In other words, the processor 112 adjusts "an index value originally located at the N-th order of the retry sequence" to the first order of the retry sequence (i.e., forming a new retry sequence). On the other hand, If N is less than the threshold value, the processor 112 does not adjust the retry sequence. Accordingly, the invalid read time and trivial adjustments to the retry sequence will be reduced.

As shown in FIG. 8, as mentioned above, the processor 112 sequentially uses the multiple threshold voltage deflections recorded in the read-voltage tables TB4, TB1, TB2, TB3, TB5, TB6, and TB7 to perform the retry test on the programming block "99". For example, the threshold value is "3", and the processor 112 uses the read-voltage tables TB3 (corresponding to the index value "3") to successfully perform/pass the retry test. Since the index value "3" corresponds to the order "4 (fourth)", which is greater than the threshold "3", after passing the retry test on the programming block "99", the processor 112 will adjust/move the index value "3" to the first order, as shown in the right table in FIG. 8.

On the other hand, if the threshold value is "3", and the processor 112 uses the read-voltage tables TB1 (corresponding to the index value "1") to successfully perform/pass the retry test. Since the index value "1" corresponds to the order "2 (second)", which is less than the threshold "3", the processor 112 does not adjust the retry sequence.

If there is no threshold value set, when performing the retry test, the number of times the processor 112 needs to perform the retry test is M/2 (M is the number of orders in the retry sequence) in average. Therefore, in one embodiment, the threshold value can be set between 2 and M/2 (i.e., M divided by 2). For example, if the retry sequence indicated by the retry sequence table TC has eight orders, the threshold value can be set to any value between 2 and 4.

In the aforementioned embodiment shown in FIG. 7, the processor 112 uses "the retry history data (the block retry parameter) of adjacent blocks in the connection table TD" to adjust the retry sequence indicated by the retry sequence table TC. In the embodiment shown in FIG. 8, the processor 112 determines whether a value of N for the N-th order of the retry sequence is greater than or equal to a set threshold value when using the target read-voltage table to successfully perform the reread test on the programming block, so as to selectively adjust/update the retry sequence. In some embodiments, the two aforementioned embodiments can be used alone or in combination.

For example, as shown in FIG. 7, when the processor 112 performs the retry test on the programming block "99", it can first adjust the retry sequence of the retry sequence table TC according to the adjacent programming block "7". Then, when the programming block "99" successfully pass the retry test, the processor 112 determines whether a value of N for the N-th order of the index value corresponding to the used the target read-voltage table is greater than the threshold value, so as to adjust the retry sequence. Accordingly, when the processor 112 performs the retry test on the next programming block, the processor 112 can use the adjusted retry sequence.

In addition, as mentioned above, the operation method of the present disclosure may be implemented by an non-transitory computer readable storage medium. The non-transitory computer readable storage medium includes multiple computer-readable instructions. When the processor 112 executes the computer-readable instructions, the computer-readable instruction causes the processor 112 accesses the memory 120 including the blocks B0-B99, and performs the above operation method shown in FIG. 4.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A control circuit, comprising:

a storage circuit configured to store a retry sequence table and a plurality of read-voltage tables; and a processor coupled to the storage circuit, and configured to access a memory comprising a plurality of blocks, wherein when a read error occurs in a first block of the plurality of blocks, the processor sequentially uses the plurality of read-voltage tables to perform a retry test on the first block according to a retry sequence indicated by the retry sequence table;

wherein when a retry history data of the first block matches an adjustment condition, the processor adjusts the retry sequence indicated by the retry sequence table;

wherein when the first block is in a programmed state, and the retry history data of the first block represents that the retry test has not been performed, the processor is configured for:

before performing the retry test on the first block, adjusting the retry sequence indicated by the retry sequence table according to a retry history data of a second block which is in the programmed state, wherein orders of entering into the programmed state of the first block and the second block are successive.

2. The control circuit of claim 1, wherein the retry history data of the second block comprises a block retry parameter of the second block, the block retry parameter of the second block represents that a corresponding one of the plurality of read-voltage tables used by the processor when the processor successfully performs a retry test on the second block;

wherein the processor updates a first order of the retry sequence according to the block retry parameter of the second block.

3. The control circuit of claim 1, wherein the storage circuit is further configured to store a connection table, the connection table is configured to record a plurality of programming blocks of the plurality of blocks that are in the programmed state;

wherein the processor is configured to record the plurality of programming blocks into the connection table sequentially according to a sequence in which the plurality of programming blocks enters into the programmed state;

wherein the plurality of programming blocks comprises the first block and the second block, and the processor is configured to use the connection table to record that the orders of entering into the programmed state of the first block and the second block are successive.

4. The control circuit of claim 3, wherein when the processor erases one of the plurality of programming blocks, the processor removes a record of the one of the plurality of programming blocks from the connection table.

5. An operation method applied to a control circuit, wherein the control circuit is configured to access a memory comprising a plurality of blocks, store a retry sequence table and a plurality of read-voltage tables, and the operation method comprises:

when a read error occurs in a first block of the plurality of blocks, sequentially using the plurality of read-voltage tables to perform a retry test on the first block according to a retry sequence indicated by the retry sequence table; and when a retry history data of the first block matches an adjustment condition, adjusting the retry sequence indicated by the retry sequence table;

wherein when the retry history data of the first block matches the adjustment condition, adjusting the retry sequence indicated by the retry sequence table comprises:

when the first block is in a programmed state, and the retry history data of the first block represents that the retry test has not been performed, adjusting the retry sequence indicated by the retry sequence table according to a retry history data of a second block which is in the programmed state before performing the retry test on the first block, wherein orders of entering into the programmed state of the first block and the second block are successive.

6. The operation method of claim 5, wherein the retry history data of the second block comprises a block retry parameter of the second block, the block retry parameter of the second block represents that a corresponding one of the plurality of read-voltage tables used by the control circuit when the control circuit successfully performs a retry test on the second block;

wherein adjusting the retry sequence indicated by the retry sequence table according to the retry history data of the second block which is in the programmed state comprises:

using the block retry parameter of the second block to update a first order of the retry sequence.

7. The operation method of claim 5, wherein the control circuit is further configured to store a connection table, the connection table is configured to record a plurality of programming blocks of the plurality of blocks that are in the programmed state;

wherein the control circuit is configured to record the plurality of programming blocks into the connection table sequentially according to a sequence in which the plurality of programming blocks enters into the programmed state; and wherein the plurality of programming blocks comprises the first block and the second block, and the control circuit is configured to use the connection table to record that the orders of entering into the programmed state of the first block and the second block are successive.

8. The operation method of claim 7, wherein when the control circuit erases one of the plurality of programming blocks, the control circuit removes a record of the one of the plurality of programming blocks from the connection table.

9. A non-transitory computer readable storage medium, comprising a plurality of computer-readable instructions, when a processor executes the plurality of computer-readable instructions, the plurality of computer-readable instructions cause the processor to access a memory comprising a plurality of blocks and perform the following:

when a read error occurs in a first block of the plurality of blocks, sequentially using a plurality of read-voltage tables to perform a retry test on the first block according to a retry sequence indicated by a retry sequence table, wherein the retry sequence table and the plurality of read-voltage tables are stored in a storage circuit coupled to the processor; and when a retry history data of the first block matches an adjustment condition, adjusting the retry sequence indicated by the retry sequence table;

wherein when the retry history data of the first block matches the adjustment condition, adjusting the retry sequence indicated by the retry sequence table comprises:

when the first block is in a programmed state, and the retry history data of the first block represents that the retry test has not been performed, adjusting the retry sequence indicated by the retry sequence table according to a retry history data of a second block which is in the programmed state before performing the retry test on the first block, wherein orders of entering into the programmed state of the first block and the second block are successive.

10. The non-transitory computer readable storage medium of claim 9, wherein the retry history data of the second block comprises a block retry parameter of the second block, the block retry parameter of the second block represents that a corresponding one of the plurality of read-voltage tables used by the processor when the processor successfully performs a retry test on the second block;

wherein adjusting the retry sequence indicated by the retry sequence table according to the retry history data of the second block which is in the programmed state comprises:

using the block retry parameter of the second block to update a first order of the retry sequence.

11. A control circuit, comprising:

a storage circuit configured to store a retry sequence table and a plurality of read-voltage tables; and a processor coupled to the storage circuit, and configured to access a memory comprising a plurality of blocks, wherein when a read error occurs in a first block of the plurality of blocks, the processor sequentially uses the plurality of read-voltage tables to perform a retry test on the first block according to a retry sequence indicated by the retry sequence table;

wherein when a retry history data of the first block matches an adjustment condition, the processor adjusts the retry sequence indicated by the retry sequence table;

wherein the retry sequence comprises M orders, and M is a positive integer greater than 1;

wherein when the processor uses a target read-voltage table of the plurality of read-voltage tables to successfully perform the retry test on the first block, the processor records a N-th order of the target read-voltage table in the retry sequence into the retry history data of the first block;

wherein when a value of N for the N-th order is greater than or equal to a threshold value, the processor adjusts the N-th order to a first order in the retry sequence, and Nis a positive integer.

12. The control circuit of claim 11, wherein when the value of N for the N-th order is less than the threshold value, the processor does not adjust the retry sequence.

13. The control circuit of claim 11, wherein the threshold value is between 2 and M divided by 2.

14. An operation method applied to a control circuit, wherein the control circuit is configured to access a memory comprising a plurality of blocks, store a retry sequence table and a plurality of read-voltage tables, and the operation method comprises:

when a read error occurs in a first block of the plurality of blocks, sequentially using the plurality of read-voltage tables to perform a retry test on the first block according to a retry sequence indicated by the retry sequence table; and when a retry history data of the first block matches an adjustment condition, adjusting the retry sequence indicated by the retry sequence table;

wherein the retry sequence comprises M orders, and M is a positive integer greater than 1;

wherein sequentially using the plurality of read-voltage tables to perform the retry test on the first block comprises:

when using a target read-voltage table of the plurality of read-voltage tables to successfully perform the retry test on the first block, recording a N-th order of the target read-voltage table in the retry sequence into the retry history data of the first block;

wherein when the retry history data of the first block matches the adjustment condition, adjusting the retry sequence indicated by the retry sequence table comprises:

when a value of N for the N-th order is greater than or equal to a threshold value, adjusting the N-th order to a first order in the retry sequence, wherein N is a positive integer.

15. The operation method of claim 14, wherein when the retry history data of the first block matches the adjustment condition, adjusting the retry sequence indicated by the retry sequence table further comprises:

when the value of N for the N-th order is less than the threshold value, not adjusting the retry sequence.

16. The operation method of claim 14, wherein the threshold value is between 2 and M divided by 2.

17. A non-transitory computer readable storage medium, comprising a plurality of computer-readable instructions, when a processor executes the plurality of computer-readable instructions, the plurality of computer-readable instructions cause the processor to access a memory comprising a plurality of blocks and perform the following:

when a read error occurs in a first block of the plurality of blocks, sequentially using a plurality of read-voltage tables to perform a retry test on the first block according to a retry sequence indicated by a retry sequence table, wherein the retry sequence table and the plurality of read-voltage tables are stored in a storage circuit coupled to the processor; and when a retry history data of the first block matches an adjustment condition, adjusting the retry sequence indicated by the retry sequence table;

wherein the retry sequence comprises M orders, and M is a positive integer greater than 1;

wherein sequentially using the plurality of read-voltage tables to perform the retry test on the first block comprises:

when using a target read-voltage table of the plurality of read-voltage tables to successfully perform the retry test on the first block, recording a N-th order of the target read-voltage table in the retry sequence into the retry history data of the first block;

wherein when the retry history data of the first block matches the adjustment condition, adjusting the retry sequence indicated by the retry sequence table comprises:

when a value of N for the N-th order is greater than or equal to a threshold value, adjusting the N-th order to a first order in the retry sequence, wherein N is a positive integer; and when the value of N for the N-th order is less than the threshold value, not adjusting the retry sequence.

* * * * *